United States Patent
Ugaji et al.

(10) Patent No.: US 8,029,933 B2
(45) Date of Patent: Oct. 4, 2011

(54) NEGATIVE ELECTRODE FOR NON-AQUEOUS ELECTROLYTE SECONDARY BATTERY, METHOD FOR MANUFACTURING THE SAME, AND NON-AQUEOUS ELECTROLYTE SECONDARY BATTERY USING THE SAME

(75) Inventors: Masaya Ugaji, Osaka (JP); Masaki Hasegawa, Osaka (JP); Taisuke Yamamoto, Nara (JP); Keisuke Ohara, Osaka (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 12/064,177

(22) PCT Filed: Sep. 21, 2007

(86) PCT No.: PCT/JP2007/068352
§ 371 (c)(1),
(2), (4) Date: Feb. 19, 2008

(87) PCT Pub. No.: WO2008/044449
PCT Pub. Date: Apr. 17, 2008

(65) Prior Publication Data
US 2010/0151320 A1    Jun. 17, 2010

(51) Int. Cl.
*H01M 4/76* (2006.01)
*H01M 4/64* (2006.01)
*H01M 4/72* (2006.01)
*H01M 4/13* (2006.01)
*H01M 4/58* (2006.01)
*H01M 4/82* (2006.01)
*H01M 6/00* (2006.01)

(52) U.S. Cl. ............... 429/238; 429/218.1; 429/233; 29/623.1; 29/623.5

(58) Field of Classification Search .............. 429/237, 429/238, 218.1, 233; 29/623.1, 623.5
See application file for complete search history.

(56) References Cited

U.S. PATENT DOCUMENTS

| | | | |
|---|---|---|---|
| 7,153,611 B2 * | 12/2006 | Minami et al. | 429/304 |
| 7,851,089 B2 * | 12/2010 | Kogetsu et al. | 429/238 |
| 2005/0064291 A1 * | 3/2005 | Sato et al. | 429/233 |
| 2005/0118503 A1 | 6/2005 | Honda et al. | |
| 2008/0193840 A1 * | 8/2008 | Shirane et al. | 429/218.1 |

FOREIGN PATENT DOCUMENTS

JP    2002-279974    9/2002
(Continued)

OTHER PUBLICATIONS

Supplementary European Search Report issued in European Patent Application No. EP 07807702.1 dated Jul. 11, 2011.
(Continued)

*Primary Examiner* — Patrick Ryan
*Assistant Examiner* — Julian Mercado
(74) *Attorney, Agent, or Firm* — McDermott Will & Emery LLP

(57) ABSTRACT

A negative electrode for a non-aqueous electrolyte secondary battery reversibly inserting and extracting lithium ions, and including current collector having concave portion and convex portion on at least one surface thereof; and columnar body formed on convex portion of current collector and including columnar body portions laminated in n stages ($n \geq 2$) in which a content ratio of an element sequentially changes in the longitudinal direction of the current collector. The content ratio of an element is different between in an odd stage and in an even stage of columnar body portions.

8 Claims, 9 Drawing Sheets

FOREIGN PATENT DOCUMENTS

| | | | |
|---|---|---|---|
| JP | 2003-017040 | | 1/2003 |
| JP | 2004-296105 | * | 10/2004 |
| JP | 2005-196970 | | 7/2005 |
| JP | 2006-278104 | | 10/2006 |
| WO | WO 2007/052803 | | 5/2007 |
| WO | WO 2007/074654 A1 | | 7/2007 |

OTHER PUBLICATIONS

K. Robbie et al., "Advanced techniques for glancing angle deposition," Journal of Vacuum Science & Technology B, vol. 16, No. 3, May 1, 1998, pp. 1115-1122.

* cited by examiner

Discharge

Charge

Discharge

Width direction

Discharge

Charge

NEGATIVE ELECTRODE FOR NON-AQUEOUS ELECTROLYTE SECONDARY BATTERY, METHOD FOR MANUFACTURING THE SAME, AND NON-AQUEOUS ELECTROLYTE SECONDARY BATTERY USING THE SAME

RELATED APPLICATIONS

This application is the U.S. National Phase under 35 U.S.C. §371 of International Application No. PCT/JP2007/068352, filed on Sep. 21, 2007, which in turn claims the benefit of Japanese Application No. 2006-280057, filed on Oct. 13, 2006, the disclosures of which Applications are incorporated by reference herein.

TECHNICAL FIELD

The present invention relates to a non-aqueous electrolyte secondary battery that is excellent in charge and discharge characteristics. More particularly, it relates to a negative electrode for a non-aqueous electrolyte secondary battery that is excellent in a capacity retaining ratio, high-rate characteristics and low-temperature characteristics; a method for manufacturing the same; and a non-aqueous electrolyte secondary battery using the same.

BACKGROUND ART

A lithium ion secondary battery that is a typical example of a non-aqueous electrolyte secondary battery is characterized by having a high electromotive force and a high energy density while it is light weight. Therefore, demands for a lithium ion secondary battery as a driving power supply of various kinds of portable electronic equipment and mobile telecommunication equipment, for example, a portable telephone, a digital camera, a video camera, and a notebook-sized personal computer, have expanded.

A lithium ion secondary battery includes a positive electrode made of a lithium-containing composite oxide; a negative electrode including lithium metal, lithium alloy or negative electrode active material inserting and extracting lithium ion; and an electrolyte.

In recent year, instead of carbon materials such as graphite that have been conventionally used as a negative electrode material, studies on an element having a property for inserting a lithium ion and having a theoretical capacity density of more than 833 mAh/cm$^3$ have been reported. An example of an element for a negative electrode active material, which has a theoretical capacity density of more than 833 mAh/cm$^3$, may include silicon (Si), tin (Sn), germanium (Ge) to be alloyed with lithium, and oxide and alloys thereof. Especially, since silicon-containing particles such as Si particles and silicon oxide particles are cheap, they have been widely investigated.

However, these elements increase their volume when they insert lithium ions at the time of charge. For example, when the negative electrode active material is Si, the state in which the maximum amount of lithium ions is inserted is expressed by $Li_{4.4}Si$. When Si is changed to $Li_{4.4}Si$, the volume is increased by 4.12 times as the volume at the time of discharge.

Therefore, in particular, when a thin film of the above-mentioned elements is deposited on a current collector by a CVD method, a sputtering method, or the like, so as to form a negative electrode active material, due to the insertion/extraction of lithium ions, a negative electrode active material expands/contracts. During repetition of charge and discharge cycles, exfoliation may occur because of the deterioration in adhesion between a negative electrode active material and a negative electrode current collector.

In order to solve the above-mentioned problems, a method of providing convexities and concavities on the surface of a current collector, depositing a negative electrode active material thin film thereon, and forming gaps in the thickness direction by etching is disclosed (see, for example, patent document 1). Furthermore, a mesh is disposed above the current collector, and a negative electrode active material thin film is deposited through the mesh, thereby suppressing the deposition of the negative electrode active material in a region corresponding to the frame of the mesh is proposed (see, for example, patent document 2).

Furthermore, a method of providing convexities and concavities on a surface of a current collector and forming a film-like negative electrode material thereon in a way in which the negative electrode material is inclined with respect to the surface perpendicular to a main surface of the negative electrode material is proposed (see, for example, patent document 3).

In secondary batteries described in patent documents 1 and 2, a thin film of a negative electrode active material is formed as columnar bodies and gaps are provided between the columnar bodies, thus preventing exfoliation and wrinkles from occurring. However, since the negative electrode active material contracts at the time when charge is started, a metal surface of the current collector may be exposed through gaps. Thereby, since the exposed current collector faces the positive electrode at the time of charge, lithium metal tends to be precipitated, which may cause deterioration of safety and capacity. Furthermore, when the height of the columnar negative electrode active material is increased or the gap interval is reduced in order to increase the battery capacity, in particular, since the tip (opening end) of the columnar negative electrode active material is not regulated by the current collector and the like, it expands more as compared with the vicinity of the current collector as the charge proceeds. As a result, columnar negative electrode active materials are brought into contact with each other and pushed to each other in the vicinity of the tip portion. Thereby, the exfoliation between the current collector and the negative electrode active material and wrinkle of the current collector may occur. Therefore, it has not been possible to prevent exfoliation between the current collector and the negative electrode active material and wrinkles in the current collector from occurring and to increase the capacity simultaneously. Furthermore, since an electrolytic solution is trapped in the gaps between the columnar-shaped negative electrode active materials that have been expanded and brought into contact with each other, movement of lithium ions when discharge is started can be prevented. Therefore, in particular, there have been problems in discharge at a high rate (hereinafter, referred to as "high-rate discharge") or discharge characteristics at a low temperature environment.

Furthermore, in a structure shown in patent document 3, as shown in FIG. 9A, with negative electrode active material 53 formed by inclining at an angle (θ), current collector 51 can be prevented from being exposed and precipitation of lithium metal can be prevented in advance. However, as in patent documents 1 and 2, as shown in FIG. 9B, negative electrode active material 53 expands larger as compared with the vicinity of current collector 51 as charge proceeds. Consequently, columnar negative electrode active materials are brought into contact with each other in the vicinity of the tip ends and pushed to each other as shown by arrows in FIG. 9B. As a result, exfoliation between current collector 51 and negative electrode active material 53 and wrinkles in current collector 51 may occur. Then, when negative electrode active materials are formed in a shape in which they expand but are not brought into contact with each other, on the contrary, high capacity cannot be realized. Furthermore, since an electrolytic solution is trapped in gaps 55 between columnar shaped negative electrode active materials that have been expanded and brought into contact with each other, the movement of lithium ions is prevented when discharge is started. In particular, there is a problem in discharge characteristics such as high-rate discharge, discharge in a low-temperature environment, and the like.

[patent document 1] Japanese Patent Application Unexamined Publication No. 2003-17040
[patent document 2] Japanese Patent Application Unexamined Publication No. 2002-279974
[patent document 3] Japanese Patent Application Unexamined Publication No. 2005-196970

SUMMARY OF THE INVENTION

The present invention provides a negative electrode for a non-aqueous electrolyte secondary battery reversibly inserting and extracting lithium ions, including a current collector having concave and convex portions on at least one surface thereof; and a columnar body formed on the convex portion of the current collector and including columnar body portions laminated in n stages ($n \geq 2$) in which a content ratio of an element sequentially changes in the longitudinal direction of the current collector. The direction in which the content ratio of an element changes is different between in an odd stage of the columnar body portion and in an even stage of the columnar body portion.

Thus, it is possible to realize a negative electrode capable of realizing high capacity while maintaining gaps between columnar bodies, preventing wrinkles from occurring in a current collector, having a long lifetime, and significantly improving the negative electrode of high-rate discharge or low-temperature characteristics at the time of discharge.

Furthermore, a method for manufacturing a negative electrode for a non-aqueous electrolyte secondary battery in accordance with the present invention is a method for manufacturing a negative electrode for a non-aqueous electrolyte secondary battery reversibly inserting and extracting lithium ions. The method includes (i) forming concave and convex portions on at least one surface of a current collector; (ii) forming an obliquely rising columnar body portion of a first stage on the convex portion; (iii) forming a columnar body portion of a second stage, obliquely rising in a direction that is different from that of the columnar body portion of the first stage, on the columnar body portion; and (iv) repeating (ii) and (iii) so that a columnar body including n stages ($n \geq 2$) of columnar body portions in which the obliquely rising direction of the columnar body portion of an odd stage and the obliquely rising direction of the columnar body portion of an even stage are made to be different from each other.

Thus, it is possible to easily produce a negative electrode having an excellent reliability without generating wrinkles in a current collector while maintaining gaps between columnar bodies.

Furthermore, the non-aqueous electrolyte secondary battery of the present invention includes the above-mentioned negative electrode for a non-aqueous electrolyte secondary battery; a positive electrode capable of reversibly inserting and extracting lithium ions; and non-aqueous electrolyte. Thus, a non-aqueous electrolyte secondary battery having high safety and excellent reliability can be manufactured.

Figure 1:
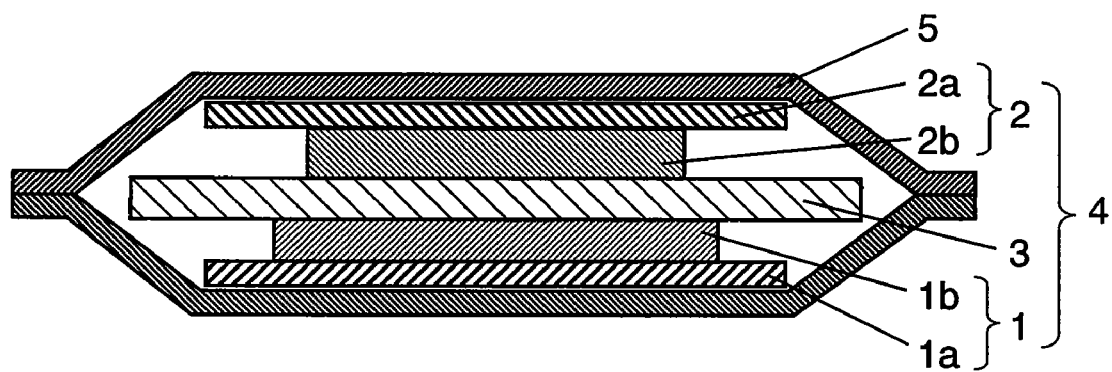
FIG. 1 is a cross-sectional view showing a non-aqueous electrolyte secondary battery in accordance with an exemplary embodiment of the present invention.

REFERENCE MARKS IN THE DRAWINGS 1 negative electrode
1a, 11 current collector (negative electrode current collector)
1b, 15 columnar body
2, 17 positive electrode
2a positive electrode current collector
2b positive electrode mixture layer
3 separator
4 electrode group
5 external case
12 concave portion
13 convex portion
15a lower side
15b upper side
16a, 16b, 16c columnar body portion
18 electrolytic solution (non-aqueous electrolyte)
40 manufacturing apparatus
41 vacuum chamber
42 gas introducing pipe
43 fixing stand
45 nozzle
46 vapor deposition source
47 vacuum pump

DETAILED DESCRIPTION OF THE PREFERRED EMBODIMENTS

Hereinafter, the exemplary embodiments of the present invention are described with reference to drawings. The same reference numbers are given to the same portions. Note here that the present invention is not particularly limited to the below described contents as long as it is based on the basic features described in this specification.

EXEMPLARY EMBODIMENTS

FIG. 1 is a cross-sectional view showing a non-aqueous electrolyte secondary battery in accordance with an exemplary embodiment of the present invention. As shown in FIG. 1, a laminated type non-aqueous electrolyte secondary battery (hereinafter, also referred to as "battery") has electrode group 4 including negative electrode 1 described in detail below; positive electrode 2 facing negative electrode 1 and reducing lithium ions at the time of discharge; and porous separator 3 disposed between negative electrode 1 and positive electrode 2 and preventing negative electrode 1 and positive electrode 2 from being brought into direct contact with each other. Electrode group 4 and electrolytic solution (not shown) having lithium ion conductivity are accommodated in external case 5. The electrolytic solution having lithium ion conductivity is impregnated into separator 3. Furthermore, one end of a positive electrode lead (not shown) and a negative electrode lead (not shown) are coupled to positive electrode current collector 2a and negative electrode current collector 1a, respectively. The other ends thereof are led out to the outside of external case 5. Furthermore, an opening of external case 5 is sealed with a resin material. Then, positive electrode 2 includes positive electrode current collector 2a and positive electrode mixture layer 2b supported by positive electrode current collector 2a.

Furthermore, as mentioned below in detail, negative electrode 1 includes negative electrode current collector 1a (hereinafter, referred to as "current collector") having concave and convex portions; and columnar body 1b having, for example, a zigzag form by laminating n stages (n≧2) obliquely rising of columnar body portions that are provided apart from each other on, at least, the convex portion. Then, in the columnar body portion (not shown), the content ratio of element formed on the convex portion of current collector 1a is allowed to change sequentially in the longitudinal (width) direction of the current collector. Furthermore, n stages (n≧2) of laminated columnar body portions are formed in a way in which the change direction of the content ratio of the element in the odd stage is different from that in the even stage.

Herein, positive electrode mixture layer 2b includes a lithium-containing composite oxide such as $LiCoO_2$, $LiNiO_2$, $Li_2MnO_4$, or a mixed compound or a composite compound thereof as the positive electrode active material. As the positive electrode active material, besides the above-mentioned materials, olivine-type lithium phosphate expressed by the general formula: $LiMPO_4$ (M=V, Fe, Ni and Mn) and lithium fluorophosphate expressed by the general formula: $Li_2MPO_4F$ (M=V, Fe, Ni and Mn) can be used. Furthermore, a part of these lithium-containing compounds may be replaced with a different atom. Surface treatment may be carried out by using metallic oxide, lithium oxide, conductive agent, and the like. A surface may be treated to have a hydrophobic property.

Positive electrode mixture layer 2b further includes a conductive agent and a binder. An example of the conductive agent may include graphites including natural graphites and artificial graphites; carbon blacks such as acetylene black, Ketjen black, channel black, furnace black, lampblack and thermal black; conductive fibers such as carbon fiber and metal fiber; carbon fluoride; metal powders such as aluminum powders; conductive whiskers of zinc oxide, potassium titanate, and the like; conductive metallic oxide such as titanium oxide; an organic conductive material such as phenylene derivatives, and the like.

An example of the binder may include, for example, PVDF, polytetrafluoroethylene, polyethylene, polypropylene, aramid resin, polyamide, polyimide, polyamide-imide, polyacrylonitrile, polyacrylic acid, polymethylacrylate ester, polyethylacrylate ester, polyhexylacrylate ester, polymethacrylic acid, polymethylmethacrylate ester, polyethylmethacrylate ester, polyhexylmethacrylate ester, polyvinylacetate ester, polyvinylpyrrolidone, polyether, polyethersulfone, hexafluoropolypropylene, styrene-butadiene rubber, carboxymethylcellulose, and the like. Furthermore, a copolymer of two or more kinds of materials selected from tetrafluoroethylene, hexafluoroethylene, hexafluoropropylene, perfluoro-alkylvinyl ether, vinylidenefluoride, chlorotrifluoroethylene, ethylene, propylene, pentafluoropropylene, fluoromethylvinyl ether, acrylic acid, and hexadiene, may be used. Furthermore, a mixture including two or more of them may be used.

As positive electrode current collector 2a used for positive electrode 2, aluminum (Al), carbon, conductive resin, and the like, can be used. Any of these materials may be subjected to surface treatment with carbon and the like.

As the non-aqueous electrolyte, an electrolytic solution in which a solute is dissolved in an organic solvent, and a so-called polymer electrolyte layer including these solutions and immobilized with a macromolecule can be used. At least in a case that an electrolytic solution is used, it is preferable that separator 3 such as a non-woven fabric or microporous membrane made of polyethylene, polypropylene, aramid resin, amide-imide, polyphenylene sulfide, polyimide, and the like, is disposed between positive electrode 2 and negative electrode 1 and separator 13 is impregnated with an electrolytic solution. Furthermore, inside or on the surface of separator 3, a heat resistant filler of alumina, magnesia, silica, titania, and the like, may be included. In addition to separator 3, a heat resistant layer formed of these fillers and a binder similar to that used for positive electrode 2 and negative electrode 1 may be provided.

The material of the non-aqueous electrolyte is selected based on the oxidation-reduction potential of each active material. The solute preferred to be used for a non-aqueous electrolyte includes $LiPF_6$, $LiBF_4$, $LiClO_4$, $LiAlCl_4$, $LiSbF_6$, $LiSCN$, $LiCF_3SO_3$, $LiN(CF_3CO_2)$, $LiN(CF_3SO_2)_2$, $LiAsF_6$, $LiB_{10}Cl_{10}$, lower aliphatic lithium carboxylate, LiF, LiCl, LiBr, LiI, chloroborane lithium, borates such as lithium bis (1,2-benzenedioleate(2-)-O,O') borate, lithium bis(2,3-naphthalenedioleate(2-)-O,O') borate, lithium bis(2,2'-biphenyldioleate (2-)-O,O') borate, lithium bis(5-fluoro-2-oleate-1-benzenesulfonate-O,O')borate, $(CF_3SO_2)_2NLi$, $LiN(CF_3SO_2)(C_4F_9SO_2)$, $(C_2F_5SO_2)_2NLi$, and lithium tetraphenyl borate, and the like. Salts generally used for a lithium battery can be applied.

Furthermore, an example of the organic solvent for dissolving the above-mentioned salts can include ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxy methane, tetrahydrofuran, tetrahydrofuran derivative such as 2-methyltetrahydrofuran, dimethyl sulfoxide, 1,3-dioxolane, dioxolane derivative such as 4-methyl-1, 3-dioxolane, formamide, acetamide, dimethylformamide, acetonitrile, propyl nitrile, nitromethane, ethyl monoglyme, phosphotriester, acetic acid ester, propionic acid ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propanesultone, anisole, fluorobenzene, and a mixture of one or more of them. Solvents generally used in a lithium battery can be applied.

Furthermore, additives such as vinylene carbonate, cyclohexylbenzene, biphenyl, diphenyl ether, vinyl ethylene carbonate, divinyl ethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, m-terphenyl, and the like, may be included.

The non-aqueous electrolyte may be used as a solid electrolyte by mixing one polymer material or a mixture of one or more of the polymer materials with the above-mentioned solute. An example of the polymer material includes polyethylene oxide, polypropylene oxide, polyphosphazene, polyaziridine, polyethylene sulfide, polyvinyl alcohol, polyvinylidene-fluoride, polyhexafluoropropylene, and the like. Furthermore, the non-aqueous electrolyte may be used in a gel state by mixing with the above-mentioned organic solvents. Furthermore, an inorganic material such as lithium nitride, lithium halide, lithium oxoate, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and a phosphorus sulfide compound may be used as the solid electrolyte. When a gel-like non-aqueous electrolyte is used, the gel-like non-aqueous electrolyte instead of separator 3 may be disposed between negative electrode 1 and positive electrode 2. Furthermore, gel-like non-aqueous electrolyte may be disposed in a neighboring portions of separator 3.

Then, as current collector 1a of negative electrode 1, metal foils of stainless steel, nickel, copper, titanium, and the like, and thin film of carbon and conductive resin are used. Furthermore, surface treatment may be carried out by using carbon, nickel, titanium, and the like.

Furthermore, it is possible to use an active material, for example, silicon (Si), tin (Sn), reversibly inserting and extracting lithium ions and having a theoretical capacity density of more than 833 $mAh/cm^3$ as the columnar body portions constituting columnar body 1b of negative electrode 1. Such materials can exert the effect of the present invention regardless of whether such a material is any of an elemental substance, an alloy, a compound, a solid solution and a composite active material including a silicon-containing material or a tin-containing material. That is to say, an example of the silicon-containing materials may include Si, $SiO_x$ ($0<x\leq2.0$), or an alloy, a compound or a solid solution of any of the above-mentioned materials in which a part of Si is replaced with at least one atom selected from the group consisting of Al, In, Cd, Bi, Sb, B, Mg, Ni, Ti, Mo, Co, Ca, Cr, Cu, Fe, Mn, Nb, Ta, V, W, Zn, C, N, and Sn. An example of the tin-containing materials may include $Ni_2Sn_4$, $Mg_2Sn$, $SnO_x$ ($0<x<2$), $SnO_2$, $SnSiO_3$, $LiSnO$, and the like.

These materials may be used singly or in combination with plural kinds of materials. An example of formation of an active material by using plural kinds of materials mentioned above may include a compound containing Si, oxygen and nitrogen or a composite of plurality of compounds containing Si and oxygen with different constituting ratios of Si and oxygen.

Hereinafter, a negative electrode for a non-aqueous electrolyte secondary battery (hereinafter, also referred to as "negative electrode") in accordance with the exemplary embodiment of the present invention is described in detail with reference to FIGS. 2A, 2B, 3A and 3B. Hereinafter, for example, a negative electrode active material (hereinafter, referred to as "active material") expressed by $SiO_x$ ($0\leq x\leq2.0$) including at least silicon is described as an example.

Figure 2A:
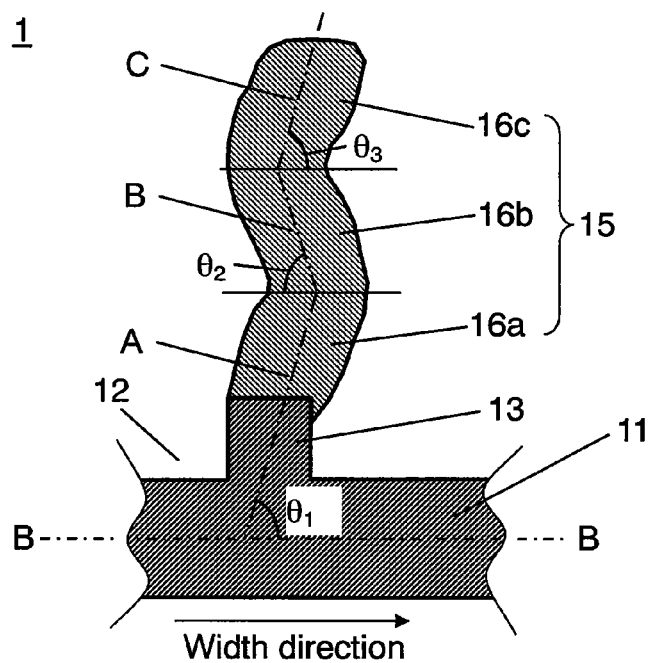
FIG. 2A is a partial sectional schematic view showing a structure of a negative electrode in accordance with the exemplary embodiment of the present invention.
Figure 2B:
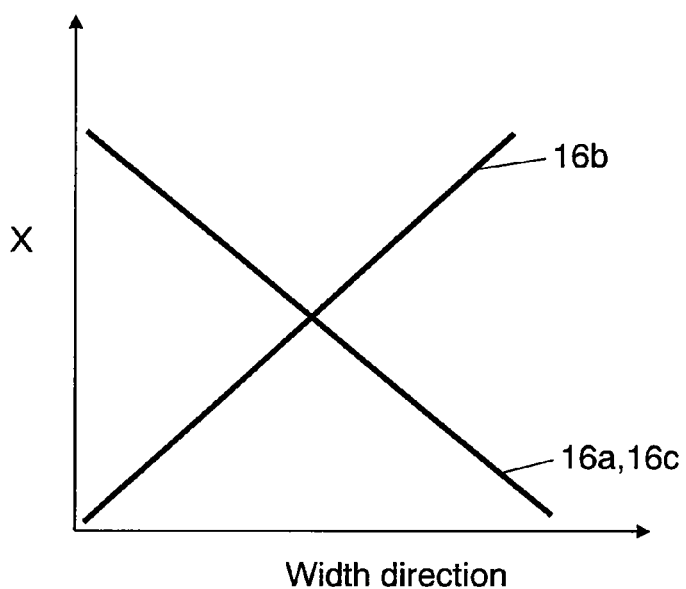
FIG. 2B is a schematic view to illustrate a change of a value of x in the width direction in accordance with the exemplary embodiment.
Figure 3A:
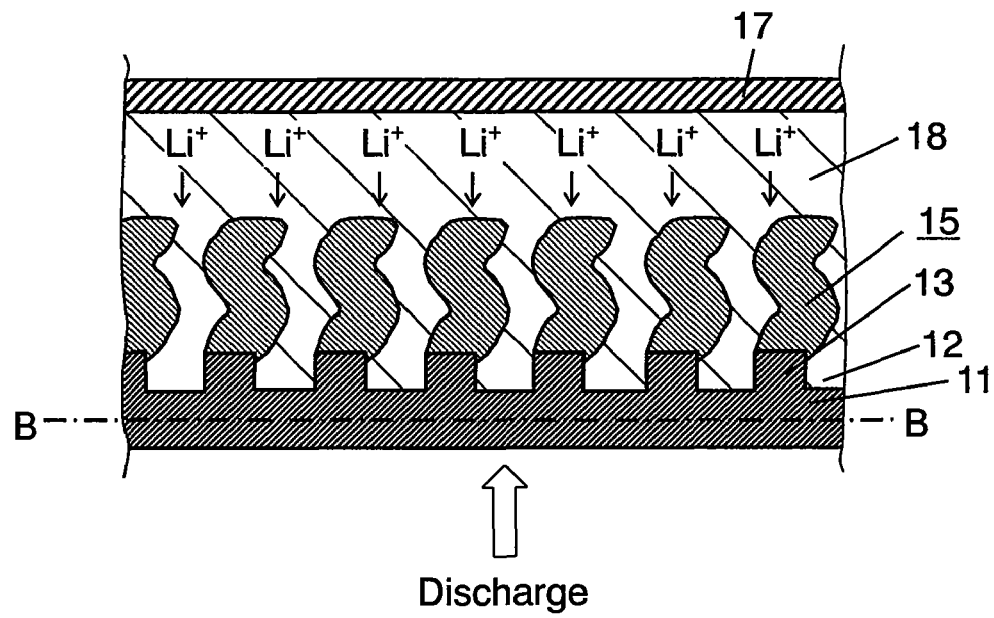
FIG. 3A is a partial sectional schematic view showing a structure of a state of a negative electrode before charging in accordance with the exemplary embodiment of the present invention.
Figure 3B:
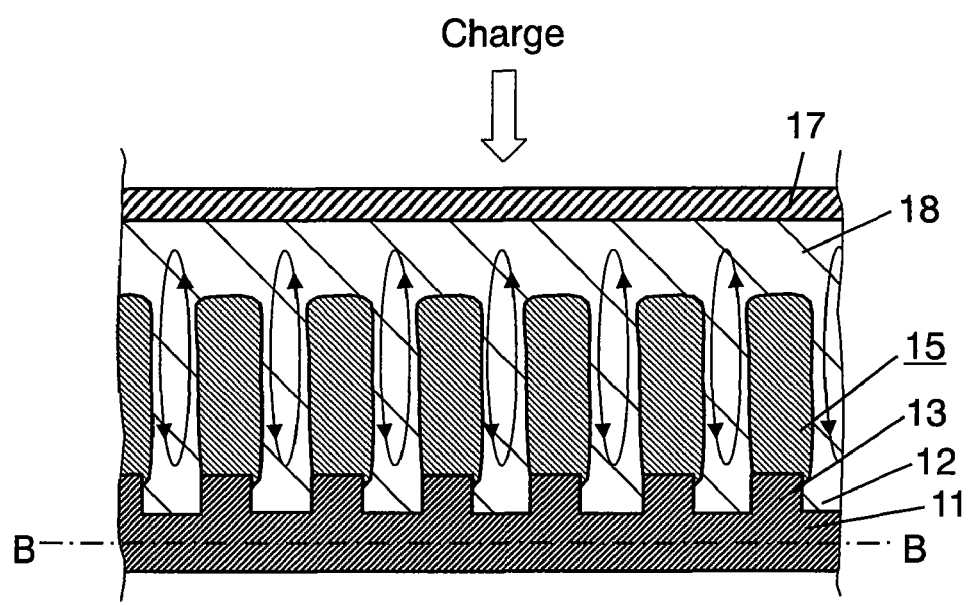
FIG. 3B is a partial sectional schematic view showing a structure of a state of the negative electrode after charging in accordance with the exemplary embodiment.

FIG. 2A is a partial sectional schematic view showing a structure of a negative electrode in accordance with the exemplary embodiment of the present invention; and FIG. 2B is a schematic view to illustrate a change of a value of x in the width direction in accordance with the exemplary embodiment. Furthermore, FIG. 3A is a partial sectional schematic view showing a structure of a state of a negative electrode before charging in accordance with the exemplary embodiment of the present invention; and FIG. 3B is a partial sectional schematic view showing a structure of a state of the negative electrode after charging in accordance with the exemplary embodiment.

As shown in FIG. 2A, concave portion 12 and convex portion 13 are provided on at least the upper surface of current collector 11 made of a conductive metal material such as copper (Cu) foil. Then, on the upper part of convex portion 13, an active material constituting negative electrode 1 and being expressed by $SiO_x$ is formed obliquely rising in a form of columnar body 15 made of n stages ($n\geq2$) of columnar body portions by an oblique vapor deposition method, for example, a sputtering method or a vacuum evaporation method. At this time, columnar body 15 is formed of a plurality of columnar body portions in a zigzag form.

Hereinafter, columnar body 15 formed by laminating n stages of (n=3) columnar body portions 16a, 16b and 16c is described specifically as an example. The same is true as long as n is 2 or more.

Firstly, columnar body portion 16a of columnar body 15 is formed on at least convex portion 13 of current collector 11 so that an intersection angle (hereinafter, referred to as "obliquely rising angle") made by center line (A) in the obliquely rising direction of columnar body portion 16a and center line (B-B) in the thickness direction of current collector 11 becomes $\theta_1$. Then, columnar body portion 16b of columnar body 15 is formed on columnar body portion 16a so that an obliquely rising angle made by center line (B) in the obliquely rising direction of columnar body portion 16b and center line (B-B) in the thickness direction of current collector 11 becomes $\theta_2$. Furthermore, columnar body portion 16c of columnar body 15 is formed on columnar body portion 16b so that an obliquely rising angle made by center line (C) in the obliquely rising direction of columnar body portion 16c and center line (B-B) in the thickness direction of current collector 11 becomes $\theta_3$. Note here that obliquely rising angles $\theta_1$, $\theta_2$ and $\theta_3$ may be the same as or different from each other as long as neighboring columnar bodies 15 are not brought into contact with each other due to expansion and contraction at the time of inserting and extracting lithium ions.

Furthermore, columnar body portions 16a, 16b and 16c constituting columnar body 15 are formed so that, for example, the content ratio of element, for example, the direction in which the value of x changes is different between columnar body portions 16a and 16c in the odd stage and columnar body portion 16b in the even stage as schematically shown in FIG. 2B. That it to say, from the side of obliquely rising angle as an acute angle of columnar body portions 16a, 16b and 16c to the side of obliquely rising angle as an obtuse angle, the value of x is sequentially increased. Note here that FIG. 2B shows that the value of x is linearly changed, but the change is not limited to this alone.

Columnar body 15 formed in a zigzag manner in three stages obliquely rising on convex portion 13 of current collector 11 expands its volume when the non-aqueous electrolyte secondary battery inserts lithium ions at the time of charge. At this time, according to the expansion of the volume, obliquely rising angles $\theta_1$, $\theta_2$ and $\theta_3$ of columnar body portions 16a, 16b, and 16c of columnar body 15 are increased. As a result, columnar body 15 is changed in such a way that it rises up. On the contrary, at the time of discharge, lithium ions are extracted. Therefore, as shown in FIG. 3A, the volume of columnar body 15 contracts, and obliquely rising angles $\theta_1$, $\theta_2$ and $\theta_3$ become smaller. Columnar body 15 is returned to the initial zigzag form.

Furthermore, as shown in FIG. 3A, since columnar body 15 having three stages of the columnar body portions obliquely rises on convex portion 13 of current collector 11 at the charge starting state, when columnar body 15 is seen by projection from the side of positive electrode 17, concave portion 12 of current collector 11 is partially shielded by columnar body 15. Therefore, lithium ions extracted from positive electrode 17 at the time of charge are prevented from directly reaching the concave portion 12 of current collector 11 by columnar body 15, and almost all of the lithium ions are inserted by columnar body 15. Thus, the deposition of lithium metal can be suppressed. Then, according to the insertion of lithium ions, the obliquely rising angles of the three stages of the columnar body portions are increased. Finally, columnar body 15 becomes a state in which it is substantially upright with respect to current collector 11. Note here that the shape is not necessarily upright but the shape may be formed in a zigzag manner with the obliquely rising angle of 90° or less depending upon the designing factors such as the number or the obliquely rising angle of the stages of columnar body portions. However, it is preferable that the obliquely rising angle is designed to be 90°.

Furthermore, as shown in FIG. 3B, when a completely charged battery is discharged, columnar body 15 including three stages of the columnar body portions, which have been expanded by changing, becomes in a state in which it rises upright with respect to current collector 11. Therefore, electrolytic solution 18 existing between neighboring columnar bodies 15 can easily move via columnar body 15 as shown by an arrow in the drawing. Electrolytic solution 18 existing between columnar bodies 15 can easily circulate through gaps in columnar body 15. Therefore, the movement of lithium ions cannot be prevented. As a result, discharge characteristics such as high-rate discharge and low-temperature discharge can be improved significantly.

Herein, the mechanism in which the obliquely rising angles of columnar body 15 are reversibly changed due to insertion and extraction of lithium ions is described with reference to FIGS. 4A and 4B. In the present invention, the columnar body is formed in n stages. However, for easily understanding, a columnar body including one columnar body portion is described. However, n staged configuration can function similarly.

Figure 4A:
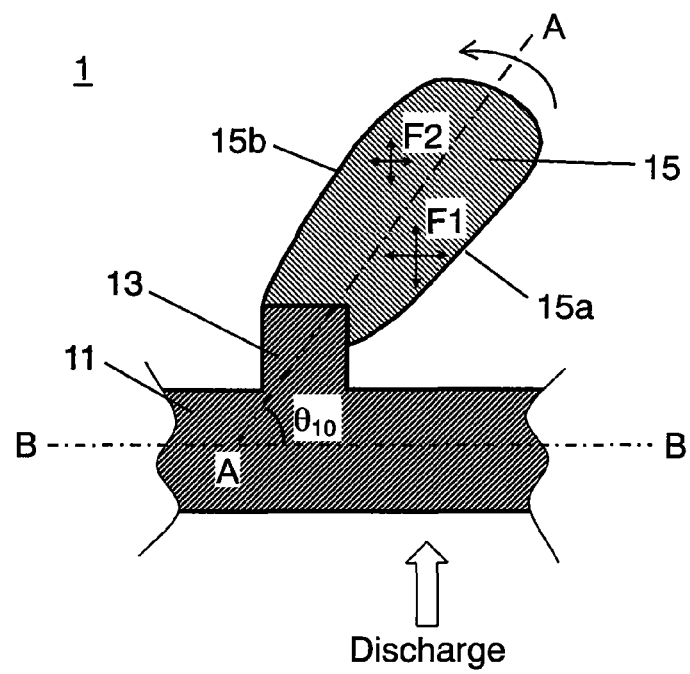
FIG. 4A is a partial sectional schematic view showing a state of a columnar body of a negative electrode before charging in accordance with the exemplary embodiment of the present invention.
Figure 4B:
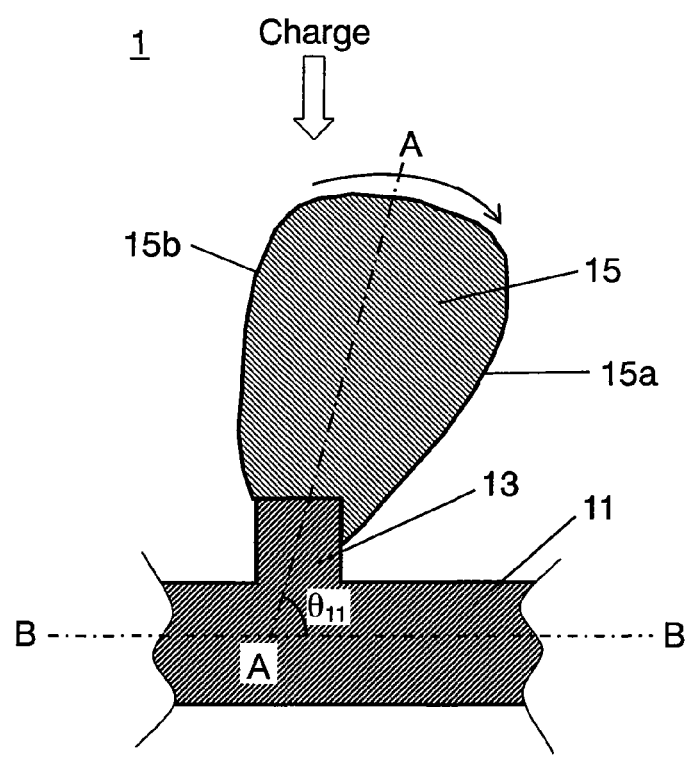
FIG. 4B is a partial sectional schematic view showing a state of a columnar body of the negative electrode after charging in accordance with the exemplary embodiment.

FIG. 4A is a partial sectional schematic view showing a state of a columnar body of a negative electrode before charging in accordance with the exemplary embodiment of the present invention; and FIG. 4B is a partial sectional schematic view showing a state of a columnar body of the negative electrode after charging in accordance with the exemplary embodiment.

In columnar body 15 shown in FIGS. 4A and 4B, the content ratio of active material element made of $SiO_x$ is changed so that the value of x is continuously increased from lower side 15a of columnar body 15 in which center line (A-A) of columnar body 15 and center line (B-B) of current collector 11 make an acute angle to upper side 15b of columnar body 15 in which an obtuse angle of is made. Then, in the active material including $SiO_x$, according to the increase of the value of x to 0-2, the expansion amount due to the insertion of lithium ions is reduced.

That is to say, as shown in FIG. 4A, expansion stress generated when lithium ions are inserted at the time of charge is continuously reduced from expansion stress F1 in lower side 15a of columnar body 15 to expansion stress F2 in upper side 15b of columnar body 15. As a result, obliquely rising angle $\theta$ made by center line (A-A) of columnar body 15 and center line (B-B) of current collector 11 is changed from $\theta_{10}$ to $\theta_{11}$. Then, in the direction shown by an arrow in FIG. 4A, columnar body 15 rises up. On the contrary, at the time of discharge, the expansion stress generated by extraction of lithium ions is reduced. As a result, obliquely rising angle $\theta$ of columnar body 15 is changed from $\theta_{11}$ to $\theta_{10}$. The shape of columnar body 15 is changed in the direction shown by an arrow in FIG. 4B.

As mentioned above, in columnar body 15, the obliquely rising angle is reversibly changed due to the insertion and extraction of lithium ions.

However, when the amount of the active material that can insert and extract lithium ions is made to be equal, in a configuration including one obliquely rising columnar body, in general, the expansion amount of the columnar body is different between the side of the current collector and the tip side. The tip side of the columnar body is expanded more. Therefore, neighboring expanded columnar bodies are brought into contact with each other, which easily cause to occur wrinkles in the current collector and exfoliation of the columnar body from the current collector.

Then, in the present invention, since the columnar body portions having different obliquely rising directions are laminated in n stages to form a columnar body, when the amount of the active material capable of inserting and extracting lithium ions is equalized, the height (thickness) of the columnar body portion in each stage can be reduced. As a result, as compared with the case in which one columnar body is used, the expansion amount at the tip of the columnar body portion of each stage is reduced. That is to say, a gap by the interval between the neighboring columnar bodies does not easily become narrow due to the expansion of the columnar body, and the columnar bodies are not easily pushed to each other. Therefore, the tolerance of the columnar body with respect to the expansion can be significantly increased. Consequently, a larger amount of lithium ions can be inserted and the battery capacity can be improved.

Furthermore, with the columnar body including n stages of columnar body portions, a gap between the neighboring columnar bodies can be maintained to be large even if the columnar body is expanded. Then, since neighboring columnar bodies are not brought into contact with each other, the generation of stress because of the contact of current collectors can be prevented and wrinkles and exfoliation caused by the stress can be prevented in advance. Therefore, a non-aqueous electrolyte secondary battery that is excellent in the charge and discharge cycle characteristics can be realized.

According to this embodiment, it is possible to manufacture a non-aqueous electrolyte secondary battery that is excellent in the capacity retaining ratio, high-rate characteristics and low-temperature characteristic while enabling the capacity to be increased.

Hereinafter, a method for manufacturing a columnar body of a negative electrode for a non-aqueous electrolyte secondary battery in accordance with the exemplary embodiment of the present invention is described with reference to FIGS. 5A to 5D and FIG. 6.

FIGS. 5A to 5D are partial sectional schematic views to illustrate a method for forming a columnar body including n stages of columnar body portions of a negative electrode for a non-aqueous electrolyte secondary battery in accordance with the exemplary embodiment of the present invention. FIG. 6 is a schematic view to illustrate a manufacturing apparatus thereof.

Herein, manufacturing apparatus 40 shown in FIG. 6 for producing a columnar body includes an electron beam (not shown) as a heating means; gas introducing pipe 42 for introducing oxygen gas into vacuum chamber 41; and fixing stand 43 for fixing a current collector in vacuum chamber 41. Manufacturing apparatus 40 has a configuration in which the inside pressure is reduced by using vacuum pump 47. Gas introducing pipe 42 has nozzle 45 for releasing oxygen gas into vacuum chamber 41. Fixing stand 43 for fixing the current collector is disposed above nozzle 45. Furthermore, vapor deposition source 46, which is deposited on the surface of the current collector so as to from a columnar body, is disposed in the vertical lower side of fixing stand 43. In manufacturing apparatus 40, with an angle of fixing stand 43, the location relation between the current collector and vapor deposition source 46 can be changed. That is to say, the obliquely rising direction of each stage of the columnar body including n stages is controlled by changing angle ω made by the normal line direction and the horizontal direction of the current collector.

This manufacturing apparatus shows an example in which a columnar body is produced by forming n stages of columnar body portions on one surface of the current collector. Actually, in a general configuration of the apparatus, columnar bodies are formed on the both surfaces of the current collector.

Figure 5A:
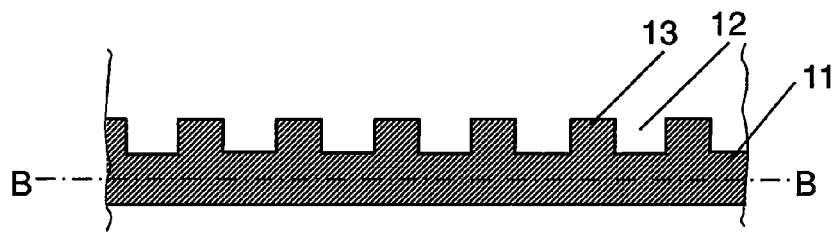
FIG. 5A is a partial sectional schematic view to illustrate a method for forming a columnar body including n stages of columnar body portions of a negative electrode for a non-aqueous electrolyte secondary battery in accordance with the exemplary embodiment of the present invention.
Figure 6:
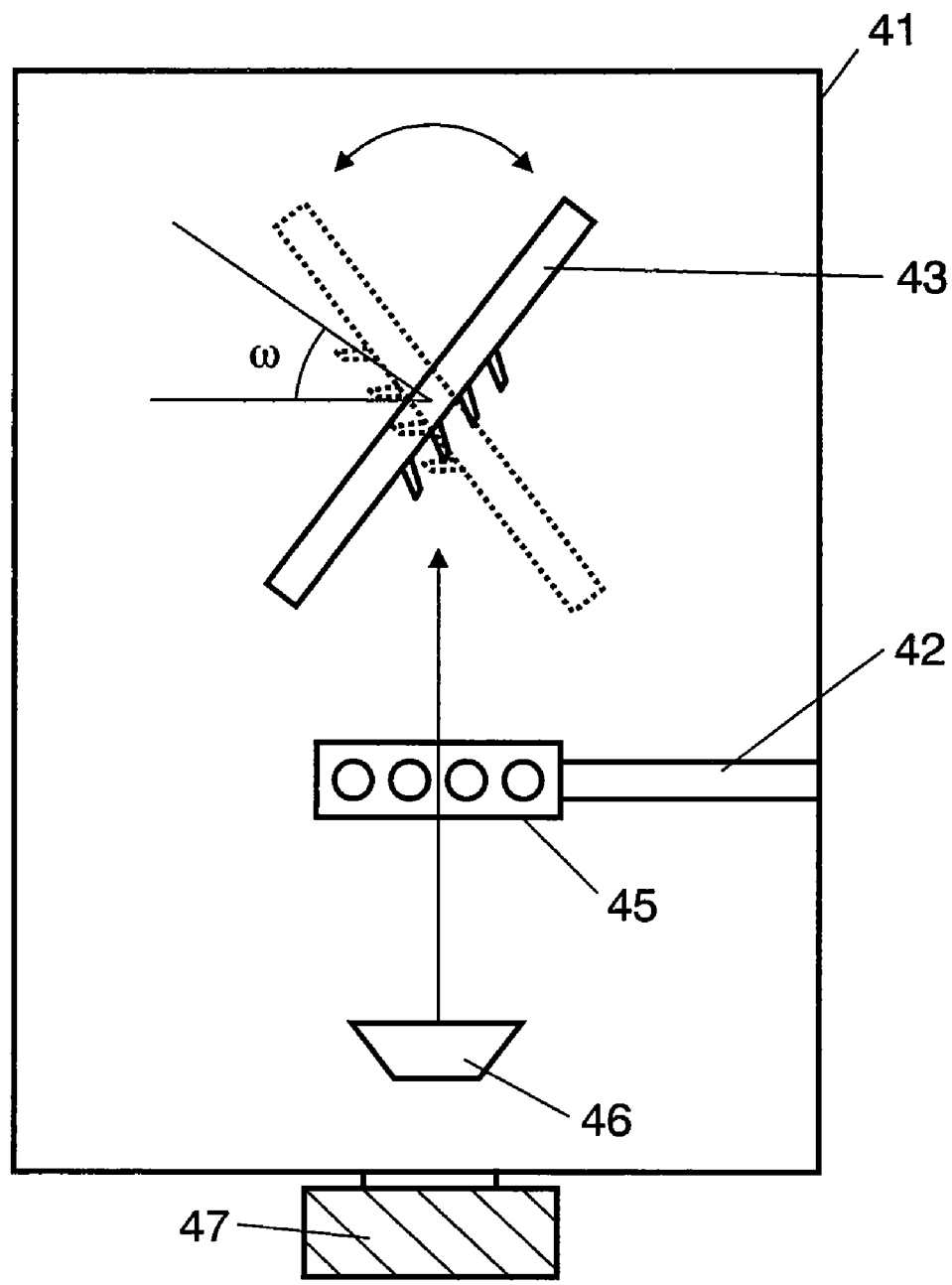
FIG. 6 is a schematic view to illustrate a manufacturing apparatus for producing n stages of columnar body portions of a negative electrode for a non-aqueous electrolyte secondary battery in accordance with the exemplary embodiment of the present invention.

Firstly, as shown in FIGS. 5A and 6, a 30 μm-thick band-like electrolytic copper foil is used and concave portion 12 and convex portion 13 are formed on the surface thereof by a plating method. Current collector 11, on which convex portions 13 are formed in intervals, for example, 20 μm intervals, is produced (first step). Then, current collector 11 is disposed on fixing stand 43 shown in FIG. 6.

Figure 5B:
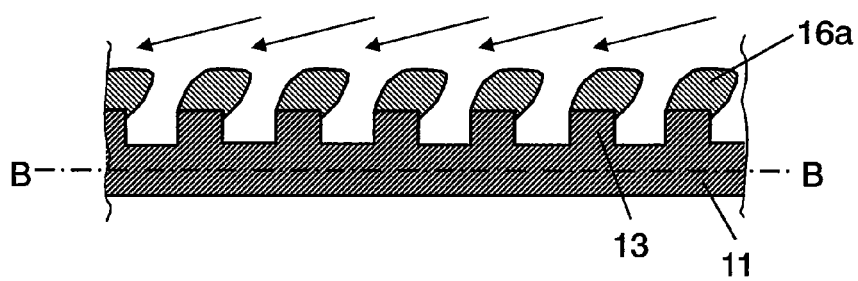
FIG. 5B is a partial sectional schematic view to illustrate a method for forming a columnar body including n stages of columnar body portions of a negative electrode for a non-aqueous electrolyte secondary battery in accordance with the exemplary embodiment of the present invention.

Next, as shown in FIGS. 5B and 6, fixing stand 43 is disposed with respect to vapor deposition source 46, at an angle of w (for example, 55°) in the normal line direction of current collector 11 and an active material such as Si (scrap silicon: purity 99.999%) is heated by an electron beam so as to be evaporated, and then allowed to enter convex portion 13 of current collector 11 from the direction shown by an arrow in FIG. 5B. At the same time, oxygen ($O_2$) gas is introduced through gas introducing pipe 42, and supplied through nozzle 45 to current collector 11. At this time, the inside of vacuum chamber 41 is made to be, for example, an atmosphere of oxygen with a pressure of 3.5 Pa. Thus, columnar body portion 16a of the first stage is formed at an angle of $\theta_1$ and to a predetermined height (thickness) on convex portion 13 of current collector 11 provided on fixing stand 43. On fixing stand 43, an active material of $SiO_x$ obtained by combining Si and oxygen is disposed (second step). At this time, columnar body 15 is formed in a state in which the value of x of the formed film of $SiO_x$ is sequentially changed in the width direction of current collector 11. For example, in FIG. 5B, the value of x in the right side in the drawing is small and the value of x in the left side is large.

Figure 5C:
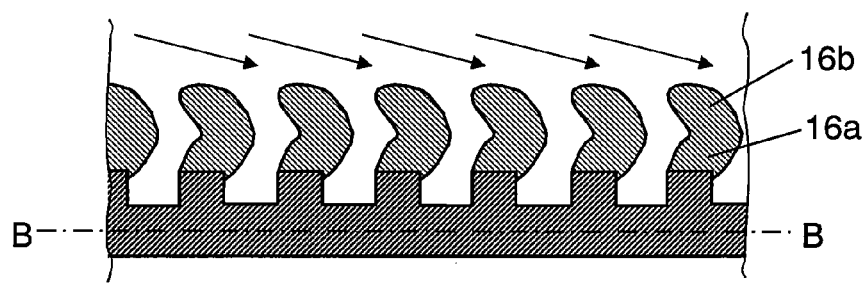
FIG. 5C is a partial sectional schematic view to illustrate a method for forming a columnar body including n stages of columnar body portions of a negative electrode for a non-aqueous electrolyte secondary battery in accordance with the exemplary embodiment of the present invention.

Next, as shown in FIGS. 5C and 6, current collector 11, in which columnar body portion 16a of the first stage is formed on convex portion 13, is disposed on the position at an angle (180−ω) (for example, 125°) with respect to the normal direction of current collector 11 by rotating fixing stand 43 as shown by a broken line in the drawing. Then, from vapor deposition source 46, for example, active material such as Si (scrap silicon: 99.999%) is allowed to evaporate and enter columnar body portion 16a of the first stage of current collector 11 from the direction shown by an arrow in FIG. 5C. At the same time, oxygen ($O_2$) gas is introduced through gas introducing pipe 42, and supplied through nozzle 45 to current collector 11. Thus, columnar body portion 16b of the second stage is formed at an angle of $\theta_2$ and to a predetermined height (thickness) on columnar body portion 16a of the first stage (third step).

At this time, columnar body 15 is formed in a state in which the value of x of the formed film of SiOx is sequentially changed in the width direction of current collector 11. For example, in columnar body portion 16b of the second stage in FIG. 5C, the value of x in the left side of the drawing is small and the value of x in the right side of the drawing is large. Thus, columnar body portion 16a of the first stage and columnar body portion 16b of the second stage are formed in a way in which the value of x is changed in the opposite direction and in which the obliquely rising angle and the obliquely rising direction are different from each other.

Figure 5D:
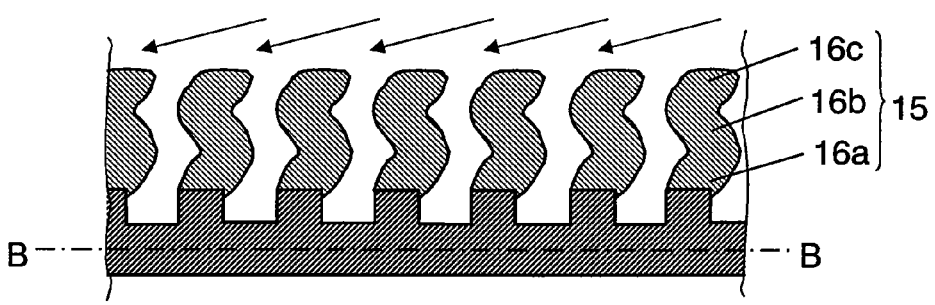
FIG. 5D is a partial sectional schematic view to illustrate a method for forming a columnar body including n stages of columnar body portions of a negative electrode for a non-aqueous electrolyte secondary battery in accordance with the exemplary embodiment of the present invention.

Next, as shown in FIGS. 5D and 6, fixing stand 43 is returned to the state same as in FIG. 5B and columnar body portion 16c of the third stage is formed to a predetermined height (thickness) on columnar body portion 16b of the second stage. At this time, in columnar body portion 16c of the third stage shown in FIG. 5D, the value of x in the right side in the drawing is small and the value of x in the left side is large. Thus, in columnar body portion 16b of the second stage and columnar body portion 16c of the third stage, the direction in which the value of x is changed is opposite to each other in the width direction of current collector 11 and the obliquely rising angle and the obliquely rising direction are different from each other. In the above-mentioned, columnar body portion 16a of the first stage and columnar body portion 16c of the third stage are formed in the same direction. Thus, negative electrode 1 having columnar body 15 including three stages of columnar body portions 16a, 16b and 16c can be produced.

Figure 7:
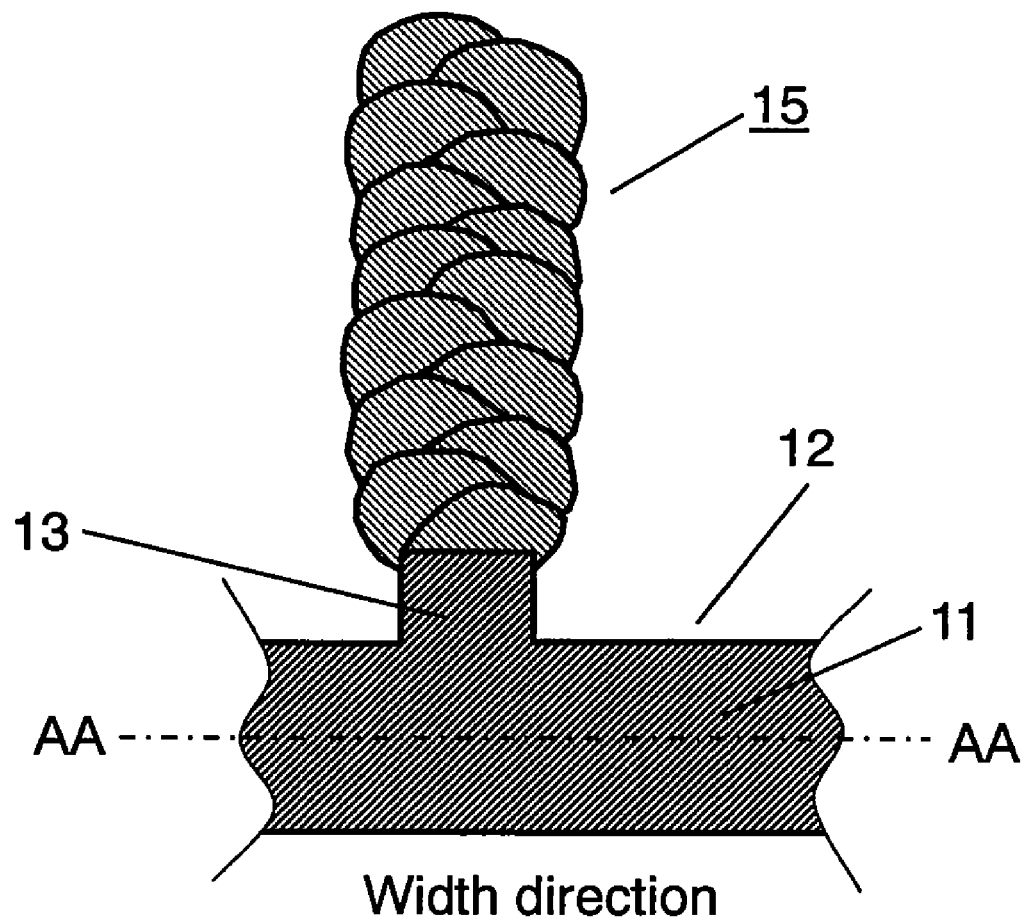
FIG. 7 is a partial sectional schematic view showing a part of the negative electrode including a columnar body made of 14 stages of columnar body portions as an example of n stages in a negative electrode for a non-aqueous electrolyte secondary battery in accordance with the exemplary embodiment of the present invention.

In the above-mentioned, a columnar body including n stages (n=3) of columnar body portions is described. However, the structure is not limited to this. By repeating the second step of FIG. 5B and the third step of FIG. 5C mentioned above, a columnar body including arbitrary n stages (n≧2) of columnar body portions, for example, 14 stages of columnar body portions shown in FIG. 7 can be formed (fourth step). Thus, since the joint portions of the columnar body portions are folded onto each other, the stress due to the expansion and contraction of the columnar body can be sufficiently relieved. Thus, the reliability is further improved.

Furthermore, in the above-mentioned manufacturing apparatus, a columnar body is produced in a current collector having a predetermined size is described as an example. However, the apparatus is not limited to this and various kinds of apparatus configurations can be formed. For example, the roll-state current collector is disposed between a send-out roll and a wind-up roll and a plurality of film-formation rolls are disposed in series, so that n-stage columnar body may be formed while moving a current collector in one direction. Furthermore, a columnar body is formed on one side of the current collector, followed by inversing the current collector so that a columnar body may be formed on the other surface of the current collector. Thus, negative electrodes can be produced with high productivity.

Hereinafter, the present invention is described in more detail with reference to the embodied examples. Note here that the present invention is not particularly limited to the below-mentioned embodied examples but materials to be used and the like can be changed as long as they do not change the summary of the present invention.

Embodied Example 1

A columnar body of a negative electrode is produced by using a manufacturing apparatus shown in FIG. 6. Firstly, as the current collector, a 30 μm-thick band-like electrolytic copper foil on the surface of which convex portions are formed by plating at intervals of 30 μm is used.

Then, Si is used as an active material of the negative electrode. A vapor deposition unit (a unit including a vapor deposition source, a crucible and an electron beam generator) is used and an oxygen gas with a purity of 99.7% is introduced through nozzle 45 into a vacuum chamber. Thus, a columnar body made of $SiO_x$ is produced in which a value of x is changed in the width direction. At this time, the inside of vacuum chamber is made to be an atmosphere of oxygen with a pressure of 3.5 Pa. Furthermore, at the time of vapor deposition, an electron beam generated by an electron beam generator is deflected by a deflection yoke, and the vapor deposition source is irradiated with the electron beam. As the vapor deposition source, for example, a scrap material (scrap silicon: purity 99.999%) generated when semiconductor wafers are formed is used.

Furthermore, the columnar body is formed at a film deposition rate of about 8 nm/s by adjusting the angle of the fixing stand to be angle ω of 60°. Thus, a columnar body portion of the first stage (for example, height: 10 μm, sectional area: 300 μm$^2$) is formed. Similarly, by the formation method described in the exemplary embodiment, the columnar body portions of the second and third stages are formed. Thus, a columnar body (for example, height: 10 μm, sectional area: 300 μm$^2$) including three stages is formed.

When an angle with respect to a center line of the current collector of the columnar body in the negative electrode is evaluated by sectional observation by using a scanning electron microscope (the product of Hitachi, S-4700), the obliquely rising angle of the columnar body portion in each stage is about 41°. At this time, the thickness (height) of the formed columnar body is 30 μm.

Furthermore, when an oxygen distribution is examined by linear distribution in the sectional direction of the columnar body portion of each stage constituting a columnar body of a negative electrode by using an electron probe micro-analyzer (hereinafter, referred to as "EPMA"), the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of the first and third stages is opposite to that of the columnar body portion of the second stage. The range of x at this time is 0.1 to 2 and 0.6 on average.

As mentioned above, a negative electrode including a columnar body made of three stages of columnar body portions on a convex portion of a current collector is manufactured.

Thereafter, Li metal is vapor-deposited to a thickness of 15 μm on the surface of the negative electrode by a vacuum evaporation method. Furthermore, on the inner peripheral side of the negative electrode, an exposed portion of Cu foil that does not face the positive electrode is provided and a negative electrode lead made of Cu is welded.

Next, a positive electrode including a positive electrode active material capable of inserting and extracting lithium ions is produced by the following method.

Firstly, 93 parts by weight of $LiCoO_2$ powder as a positive electrode active material and 4 parts by weight of acetylene black as a conductive agent are mixed. A N-methyl-2-pyrrolidone (NMP) solution including polyvinylidene fluoride (PVDF) (#1320, Kureha Kagaku) as a binder is mixed to the powder so that the weight of PVDF becomes 3 parts by weight. An appropriate amount of NMP is added to this mixture so as to prepare a positive electrode mixture paste. This positive electrode mixture paste is coated on both surfaces of a positive electrode current collector (thickness: 15 μm) made of an aluminum (Al) foil by a doctor blade method, and pressure-rolled so that a density of the positive electrode mixture layer becomes 3.5 g/cc and the thickness becomes 160 μm, and sufficiently dried at 85° C., followed by cutting thereof. Thus, a positive electrode is obtained. On the inner peripheral side of the positive electrode, an exposed portion is provided on Al foil that does not face the negative electrode and a positive electrode lead made of Al is welded.

The negative electrode and positive electrode manufactured as mentioned above are laminated onto each other via a 25 μm-thick separator made of porous polypropylene so as to form an electrode group (40 mm×30 mm). The electrode group is impregnated with an electrolytic solution that is a mixed solution of $LiPF_6$ dissolved in a solvent of ethylene carbonate:diethyl carbonate and accommodated in an external case (material: aluminum) and an opening of the external case is sealed. Thus, a laminated type battery is manufactured. Note here that design capacity of the battery is made to be 21 mAh. This is defined as sample 1.

Embodied Example 2

A negative electrode is produced in the same manner as in the embodied example 1 except that a columnar body is disposed so that an angle of the fixing stand is adjusted and angle ω is made to be 70°.

Note here that an obliquely rising angle of the columnar body portion of each stage is about 54° and the thickness (height) of the formed columnar body is 30 μm.

Furthermore, by using EPMA, the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of the first and third stages is opposite to that of the columnar body portion of the second stage. The range of x at this time is 0.1 to 2 and 0.6 on average.

A non-aqueous electrolyte secondary battery manufactured by the same method as in the embodied example 1 except that the above-mentioned negative electrode is used is defined as sample 2.

Embodied Example 3

A negative electrode is produced in the same manner as in the embodied example 1 except that a columnar body is disposed so that an angle of the fixing stand is adjusted and angle ω is made to be 50°.

Note here that an obliquely rising angle of the columnar body portion of each stage is about 31° and the thickness (height) of the formed columnar body is 30 μm.

Furthermore, by using EPMA, the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of the first and third stages is opposite to that of the columnar body portion of the second stage. The range of x at this time is 0.1 to 2 and 0.6 on average.

A non-aqueous electrolyte secondary battery manufactured by the same method as in the embodied example 1 except that the above-mentioned negative electrode is used is defined as sample 3.

Embodied Example 4

A negative electrode is produced in the same manner as in the embodied example 1 except that a columnar body is formed in four stages and that the thickness of the columnar body portion of each stage is 7.5 μm.

Note here that an obliquely rising angle of the columnar body portion of each stage is about 41° and the thickness (height) of the formed columnar body is 30 μm.

Furthermore, by using EPMA, the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of the first and third stages is opposite to that of the columnar body portions of the second and fourth stages. The range of x at this time is 0.1 to 2 and 0.6 on average.

A non-aqueous electrolyte secondary battery manufactured by the same method as in the embodied example 1 except that the above-mentioned negative electrode is used is defined as sample 4.

Embodied Example 5

A negative electrode is produced in the same manner as in the embodied example 1 except that the thickness of a columnar body portion of each stage is made to be 8 μm and the inside of a vacuum chamber is an atmosphere of oxygen with a pressure of 1.7 Pa.

Note here that an obliquely rising angle of the columnar body portion of each stage is about 41° and the thickness (height) of the formed columnar body is 24 μm.

Furthermore, by using EPMA, the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of the first and third stages is opposite to that of the columnar body portion of the second stage. The range of x at this time is 0.1 to 2 and 0.3 on average.

Thereafter, Li metal is vapor-deposited to a thickness of 10 μm on the surface of the negative electrode by a vapor deposition method.

A non-aqueous electrolyte secondary battery manufactured by the same method as in the embodied example 1 except that the above-mentioned negative electrode is used is defined as sample 5.

Embodied Example 6

A negative electrode is produced in the same manner as in the embodied example 1 except that a columnar body including 30 stages of columnar body portions is formed and the thickness of the columnar body portion of each stage is made to be 1.0 μm.

Note here that an obliquely rising angle of the columnar body portion of each stage is about 41° and the thickness (height) of the formed columnar body is 30 μm.

Furthermore, by using EPMA, the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of odd stages is opposite to that of the columnar body portions of the even stages. The range of x at this time is 0.1 to 2 and 0.6 on average.

A non-aqueous electrolyte secondary battery manufactured by the same method as in the embodied example 1 except that the above-mentioned negative electrode is used is defined as sample 6.

Embodied Example 7

A negative electrode is produced in the same manner as in the embodied example 1 except that a columnar body including 60 stages of columnar body portions is formed and the thickness of a columnar body portion of each stage is made to be 0.5 μm.

Note here that an obliquely rising angle of the columnar body portion of each stage is about 41° and the thickness (height) of the formed columnar body is 30 μm.

Furthermore, by using EPMA, the oxygen concentration (value of x) is continuously increased from the side of the obliquely rising angle θ to the direction of that of (180−θ) in the width direction of each columnar body portion. The direction in which the oxygen concentration (value of x) is increased in the columnar body portions of odd stages is opposite to that of the columnar body portions of the even stages. The range of x at this time is 0.1 to 2 and 0.6 on average.

A non-aqueous electrolyte secondary battery manufactured by the same method as in the embodied example 1 except that the above-mentioned negative electrode is used is defined as sample 7.

Comparative Example 1

A negative electrode is produced in the same manner as in the embodied example 1 except that a columnar body is obliquely formed in one stage to the thickness (height) 30 μm.

When an angle with respect to a center line of the current collector of the columnar body in the negative electrode is evaluated by sectional observation by using a scanning electron microscope (the product of Hitachi, S-4700), the obliquely rising angle of the columnar body is about 41°. At this time, the thickness (height) of the columnar body is 30 μm.

Furthermore, when oxygen distribution is examined by linear distribution measurement in the sectional direction constituting a columnar body of a negative electrode by using EPMA, the oxygen concentration (value of x) is continuously increased from the side of the obliquely rising angle θ to the direction of that of (180−θ) in the width direction of each columnar body portion. The range of x at this time is 0.1 to 2 and 0.6 on average.

A non-aqueous electrolyte secondary battery manufactured by the same method as in the embodied example 1 except that the above-mentioned negative electrode is used is defined as sample C1.

Each of the non-aqueous electrolyte secondary batteries manufactured as mentioned above is subjected to the following evaluation.

(Measurement of Battery Capacity)

Each of the non-aqueous electrolyte secondary batteries is charged and discharged in an environment temperature of 25° C. under the below-mentioned conditions.

Firstly, charge is carried out at constant current at hour rate of 1.0 C to the design capacity (21 mAh), namely at 21 mA, until the battery voltage becomes 4.2 V. Then, constant voltage charge for attenuating to the current value of hour rate of 0.05 C (1.05 mA) at 4.2 V of constant voltage is carried out. Then, the battery is in a rest for 30 minutes.

Thereafter, constant current discharge is carried out at a current value of hour rate of 0.2 C (4.2 mA) until the battery voltage is reduced to 3.0 V.

The above-mentioned charge and discharge is defined as one cycle. The discharge capacity in the third cycle is defined as the battery capacity.

(Charge and Discharge Cycle Characteristics)

Each of the non-aqueous electrolyte secondary batteries is charged and discharged in a environment temperature of 25° C. under the below-mentioned conditions.

Firstly, charge is carried out at constant current at hour rate of 1.0 C to the design capacity (21 mAh), namely at 21 mA, until the battery voltage becomes 4.2 V. Then, constant voltage charge for reducing to the current value of hour rate of 0.05 C (1.05 mA) at 4.2 V of constant voltage is carried out. Then, the battery is in a rest for 30 minutes.

Thereafter, constant current discharge is carried out at a current value of hour rate of 0.2 C (4.2 mA) until the battery voltage is reduced to 3.0V. Then, the battery is in a rest for 30 minutes.

The above-mentioned charge and discharge is defined as one cycle and the cycle is repeated 500 times. Then, the rate of the discharge capacity of the 500th cycle with respect to the discharge capacity of the first cycle is expressed by percentage. This percentage is defined as the capacity retaining ratio (%). That it to say, as the capacity retaining ratio is nearer to 100, it is shown that the charge and discharge cycle characteristic is more excellent.

Furthermore, the ratio of the discharge capacity in the discharge at 0.2 C (4.2 mA) to charge capacity is expressed by percentage, and the value expressed by the percentage is defined as charge and discharge efficiency (%). Furthermore, the ratio of the discharge capacity in discharge at high rate of 1.0 C (21 mA) to the discharge capacity in discharge at 0.2 C (4.2 mA) is expressed by the percentage. The value expressed by the percentage is defined as the high-rate ratio (%).

Then, the above-mentioned capacity retaining ratio, charge and discharge efficiency, and high rate ratio are observed at the tenth cycle and 500th cycle.

Hereinafter, parameters and evaluation results of samples 1 to 7 and a sample C1 are shown in Table 1 and Table 2.

TABLE 1

|  | *1 (Pa) | n (stage) | *2 (°) | *3 (μm) | *4 (μm) | *5 |
|---|---|---|---|---|---|---|
| Sample 1 | 3.5 | 3 | 41 | 10 | 30 | 0.6 |
| Sample 2 | 3.5 | 3 | 54 | 10 | 30 | 0.6 |
| Sample 3 | 3.5 | 3 | 31 | 10 | 30 | 0.6 |
| Sample 4 | 3.5 | 4 | 41 | 7.5 | 30 | 0.6 |
| Sample 5 | 1.7 | 3 | 41 | 8 | 24 | 0.3 |
| Sample 6 | 3.5 | 30 | 41 | 1.0 | 30 | 0.6 |
| Sample 7 | 3.5 | 60 | 41 | 0.5 | 30 | 0.6 |
| Sample C1 | 3.5 | 1 | 41 | 30 | 30 | 0.6 |

*1: Degree of vacuum when $O_2$ is introduced
*2: Obliquely rising angle
*3: Thickness of columnar body portion
*4: Thickness of columnar body
*5: Average value of x in $SiO_x$

TABLE 2

|  | Number of cycles (time) | Charge/discharge efficiency (%) | High-rate ratio (%) | Capacity retaining ratio (%) |
|---|---|---|---|---|
| Sample 1 | 10 | 99.8 | 93 | 100 |
|  | 500 | 99.8 | 87 | 80 |
| Sample 2 | 10 | 99.8 | 93 | 100 |
|  | 500 | 99.8 | 87 | 80 |
| Sample 3 | 10 | 99.8 | 93 | 100 |
|  | 500 | 99.8 | 87 | 80 |
| Sample 4 | 10 | 99.8 | 93 | 100 |
|  | 500 | 99.8 | 88 | 82 |
| Sample 5 | 10 | 99.8 | 93 | 100 |
|  | 500 | 99.8 | 85 | 78 |
| Sample 6 | 10 | 99.8 | 93 | 100 |
|  | 500 | 99.8 | 88 | 82 |
| Sample 7 | 10 | 99.8 | 93 | 100 |
|  | 500 | 99.8 | 88 | 82 |
| Sample C1 | 10 | 99.8 | 93 | 100 |
|  | 500 | 99.2 | 83 | 48 |

Figure 8:
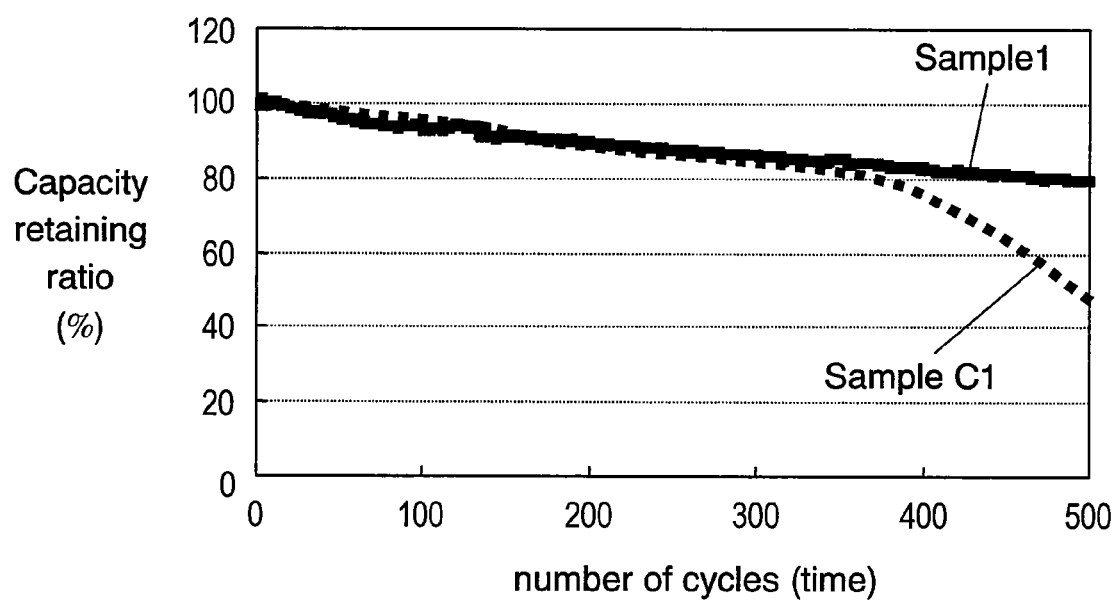
FIG. 8 is a graph showing an example of the charge and discharge cycle characteristic in samples of Embodied Example and Comparative Example.
Figure 9A:
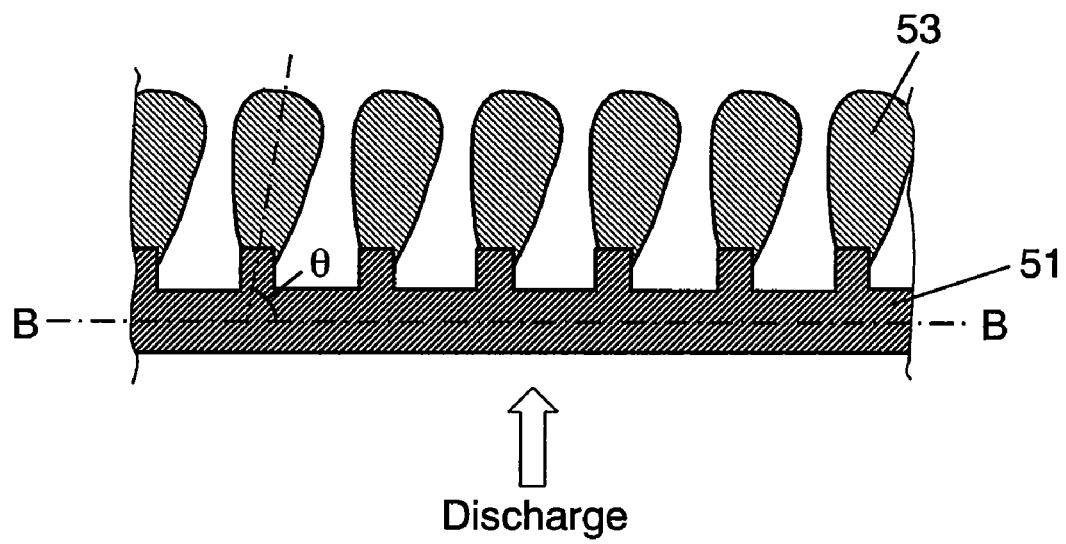
FIG. 9A is a partial sectional schematic view showing a structure of a state of a conventional negative electrode before charging.
Figure 9B:
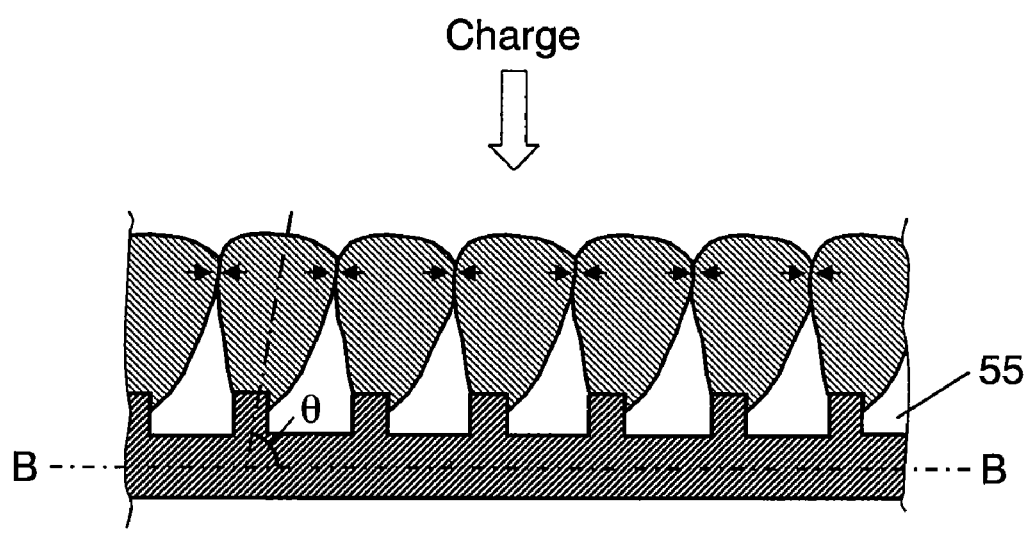
FIG. 9B is a partial sectional schematic view showing a structure of a state of a conventional negative electrode after charging.

FIG. 8 shows evaluation results of sample 1 and sample C1 as one example of charge and discharge cycle characteristics.

As shown in Table 1, Table 2 and FIG. 8, when sample 1 and sample C1 are compared with each other, around the tenth cycle in the initial cycle, there is no difference in the capacity retaining ratio. However, in the 500th cycle, sample 1 shows about 80% of the capacity retaining ratio while sample C1 shows that the capacity retaining ratio is reduced to about 50%. This is thought to be as follows. Since a columnar body is formed in a multistage form such as three-stage form, at the time of charge and discharge, neighboring columnar bodies are not brought into contact with each other. Thus, the wrinkles and distortion are prevented from occurring in the current collector, and exfoliation and crack of the columnar body can be suppressed.

Consequently, it is confirmed that a negative electrode having a columnar body including three stages of columnar body portions formed on a convex portion of a current collector is effective in terms of cycle characteristics.

Furthermore, as shown in Table 1 and Table 2, in samples 1 to 3, even when an obliquely rising angle of each columnar body portion of the columnar body is changed from 31° to 54°, there is no significant difference in the capacity retaining ratio, charge and discharge efficiency, and high-rate ratio, showing that excellent characteristics can be maintained. Similarly, in samples 1, 4, 6, and 7, even when the number of stages of the columnar body portions constituting the columnar body is changed, there is no significant difference in the capacity retaining ratio, charge and discharge efficiency, and high-rate ratio, showing that excellent characteristics can be maintained. At this time, in particular, in samples 6 and 7 in which the number of stages of the columnar body portions is increased, since joint portions of the respective columnar body portions can be folded onto each other, it is thought that stress relieving effect can be improved with the increase in the number of joint portions.

Furthermore, in samples 1 and 5, when the average value of x of SiOx constituting the columnar body is 0.3 and 0.6, in sample 5 with smaller average value of x, somewhat deterioration in the capacity retaining ratio after 500 cycles is observed as compared with sample 1 with larger average value of x. This means that a small average value of x corresponds to a large expansion and contraction at the time of charge and discharge. Therefore, the stress and distortion to the current collector due to expansion and contraction of the columnar body is increased, thus deteriorating the capacity retaining ratio.

In the above-mentioned embodied examples, an example in which Si and $SiO_x$ are used as an active material for the columnar body is described. However, the material is not particularly limited to them as long as the material is an element capable of reversibly inserting and extracting lithium ions. It is preferable that the material is at least one of Al, In, Zn, Cd, Bi, Sb, Ge, Pb, Sn, and the like. Furthermore, as the active material, materials other than each of the above-mentioned elements may be included. For example, transition metals or 2A group elements may be included.

In the present invention, the shape and forming intervals of the convex portions formed on the current collector are not particularly limited to the description mentioned in each of the above-mentioned exemplary embodiments but may be any shapes as long as they can form an obliquely rising columnar body.

Furthermore, an obliquely rising angle made by a center line of the columnar body and a center line of the current collector as well as the shape and dimension of the columnar body are not particularly limited to the above-mentioned exemplary embodiments but they may be appropriately changed in accordance with the manufacturing method of the negative electrode and the characteristics necessary to the non-aqueous electrolyte secondary battery.

INDUSTRIAL APPLICABILITY

A negative electrode for a non-aqueous electrolyte secondary battery in accordance with the present invention can provide a non-aqueous electrolyte secondary battery that is excellent in high-rate characteristics and charge and discharge cycle characteristics while enabling a high capacity. Therefore, the negative electrode for a non-aqueous electrolyte secondary battery is effective as a secondary battery for electronic equipment such as portable telephone and PDA and for large-size electronic equipment, which are being demanded in the future.

The invention claimed is:

1. A negative electrode for a non-aqueous electrolyte secondary battery reversibly inserting and extracting lithium ions, the negative electrode comprising:
   a current collector including concave and convex portions on at least one surface thereof and having a longitudinal direction; and
   a columnar body formed on the convex portion of the current collector and including columnar body portions laminated in n stages (n≧2) in which a content ratio of an element sequentially changes in the longitudinal direction of the current collector,
   wherein a direction in which the content ratio of an element changes is different between in an odd stage of the columnar body portions and in an even stage of the columnar body portions.

2. The negative electrode for a non-aqueous electrolyte secondary battery of claim 1, wherein in a discharged state, the n stages of the columnar body portions of the columnar body are formed obliquely rising on the convex portions of the current collector, and the odd stage and the even stage are laminated in a zigzag form in a thickness direction of the columnar body portions.

3. The negative electrode for a non-aqueous electrolyte secondary battery of claim 1, wherein in a charged state, an acute angle in an intersection angle between a center line in an obliquely rising direction of one of the columnar body portions and a center line in a thickness direction of the current collector is larger than that in a discharged state.

4. The negative electrode for a non-aqueous electrolyte secondary battery of claim 1, wherein an active material reversibly inserting and extracting at least lithium ions and having a theoretical capacity density of more than 833 mAh/$cm^3$ is used for the columnar body portions.

5. The negative electrode for a non-aqueous electrolyte secondary battery of claim 4, wherein a material expressed by $SiO_x$, where 0<x≦2, including at least silicon is used as the active material.

6. The negative electrode for a non-aqueous electrolyte secondary battery of claim 5, wherein a value of x of the material expressed by $SiO_x$ including silicon is continuously increased from a side of an acute angle to a side of an obtuse angle with respect to an intersection angle between a center line in an obliquely rising direction of one of the columnar body portions and a center line in a thickness direction of the current collector.

7. A non-aqueous electrolyte secondary battery, comprising:
   the negative electrode for a non-aqueous electrolyte secondary battery of claim 1;

a positive electrode for reversibly inserting and extracting the lithium ions; and a non-aqueous electrolyte.

8. A method for manufacturing a negative electrode for a non-aqueous electrolyte secondary battery reversibly inserting and extracting lithium ions, the method comprising:
- (i) forming concave and convex portions on at least one surface of a current collector;
- (ii) forming an obliquely rising columnar body portion of a first stage on the convex portions;
- (iii) forming a columnar body portion of a second stage on the obliquely rising columnar body portion of the first stage, the columnar body portion of the second stage obliquely rising in a direction that is different from that of the obliquely rising columnar body portion of the first stage; and
- (iv) repeating (ii) and (iii) so that a columnar body including n stages (n≧2) of columnar body portions in which an obliquely rising direction of a columnar body portion of an odd stage and an obliquely rising direction of a columnar body portion of an even stage of the columnar body portions are made to be different from each other.

* * * * *